(No Model.)

F. P. SARGENT.
DEVICE FOR ADJUSTING SHAFTS.

No. 349,005. Patented Sept. 14, 1886.

WITNESSES:
Julius Twiss.
David K. Andrews

INVENTOR
Frank P. Sargent,
BY A. W. Johnson
ATTORNEY

United States Patent Office.

FRANK P. SARGENT, OF NEW HAVEN, CONNECTICUT.

DEVICE FOR ADJUSTING SHAFTS.

SPECIFICATION forming part of Letters Patent No. 349,005, dated September 14, 1886.

Application filed April 21, 1886. Serial No. 199,591. (No model.)

*To all whom it may concern:*

Be it known that I, FRANK P. SARGENT, a citizen of the United States, residing at New Haven, in the county of New Haven and State of Connecticut, have invented certain new and useful Improvements in Screw Adjustment of a Shaft within a Collar; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an arrangement of set-screws for securing and adjusting a shaft, arbor, or shank, and the like, within a sleeve or collar, or a sleeve upon a shaft, as the case may be, whereby the set-screws may be manipulated so as to cause the shaft to turn within the sleeve, or the relative positions of the sleeve and shaft to be changed with relation to each other in the direction of their circumferences; and it consists in two screws passing through the sleeve, which is threaded to receive them, and impinging upon suitable seats formed in or upon the shaft, so arranged that the pressure exerted upon the shaft by each screw is in a direction to one side of the center of the shaft, or tangent to a circle concentric with the shaft, and so that the pressure of each screw has a tendency to turn the shaft within the sleeve in the opposite direction from that of the other.

Figure 1:
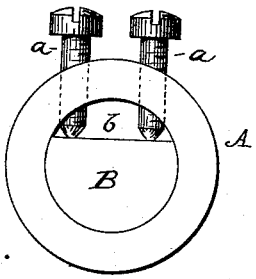
Figure 2:
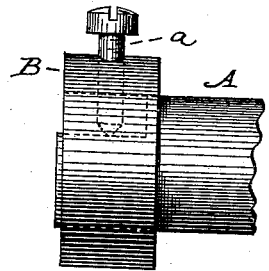
Figure 3:
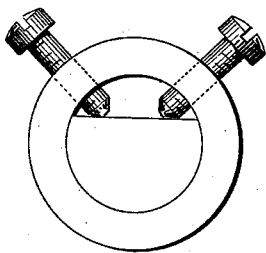
Figure 4:
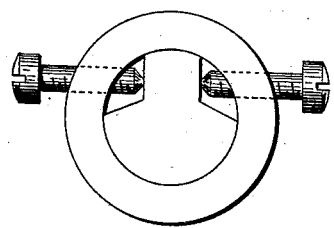

In the drawings, Figure 1 is an end view of a shaft within a sleeve or collar, showing my arrangement of set-screws. Fig. 2 is a side view of the same. Figs. 3 and 4 are end views of shaft and sleeve, representing modifications of my invention.

Similar letters refer to similar parts.

A designates a sleeve or collar, within which is a shaft, B, a portion of which is cut away to form seats $b$ for the set-screws $a\,a$ to impinge upon. The positions of the set-screws $a\,a$ with relation to the other parts are such that when either screw alone is driven against its seat $b$ the pressure exerted thereon is in a direction to one side of the center of the shaft, and thereby has a tendency to cause the shaft to turn within the sleeve, and the pressure of each screw has a tendency to turn the shaft in the opposite direction from that of the other; hence it is obvious that when both screws are driven against the shaft the sleeve and shaft will thereby be firmly and rigidly held together, and that by withdrawing one screw and advancing the other the shaft may be caused to turn slightly within the sleeve.

This invention is of especial value in certain cases where very nice or particular adjustment of the shaft with relation to the sleeve or collar in the direction of its circumference is required—as, for instance, the shaft or shank of a looper-hook or a hook-driver within its driving collar or sleeve in sewing-machines using such hook or looper.

It will be observed that in Figs. 1 and 4 the set-screws are placed at right angles to their seats in the shaft, while in Fig. 3 they are inclined to their seats; but their use and effect upon the shaft is practically the same.

I claim—

The herein-described invention, consisting in the combination, with a shaft within a sleeve or collar and with said collar, of two set-screws passing through said sleeve or collar and adapted to impinge upon suitable seats formed in or upon said shaft, so arranged that the pressure of each of said set-screws is exerted upon said shaft in a direction to one side of its center or tangent to a circle concentric therewith, substantially as set forth.

In testimony whereof I affix my signature in presence of two witnesses.

FRANK P. SARGENT.

Witnesses:
JULIUS TWISS,
A. W. JOHNSON.